(12) United States Patent
Patscheider et al.

(10) Patent No.: US 12,481,091 B2
(45) Date of Patent: Nov. 25, 2025

(54) TUNABLE LENS AND METHOD FOR OPERATING A TUNABLE LENS

(71) Applicant: Optotune AG, Dietikon (CH)

(72) Inventors: Roman Patscheider, Winterthur (CH); Christopher Laning, Windisch (CH); Erik Hebestreit, Regensdorf (CH); Manuel Aschwanden, Allenwinden (CH); David Andreas Niederer, Küttigen (CH); Stephan Smolka, Zürich (CH)

(73) Assignee: Optotune Switzerland AG, Dietikon (CH)

( * ) Notice: Subject to any disclaimer, the term of this patent is extended or adjusted under 35 U.S.C. 154(b) by 31 days.

(21) Appl. No.: 17/557,095

(22) Filed: Dec. 21, 2021

(65) Prior Publication Data

US 2022/0196887 A1    Jun. 23, 2022

(30) Foreign Application Priority Data

Dec. 22, 2020   (DE) .......................... 102020134753.7

(51) Int. Cl.
   *G02B 3/14*      (2006.01)
   *G02B 26/00*     (2006.01)
   *G02C 7/08*      (2006.01)

(52) U.S. Cl.
   CPC ............. *G02B 3/14* (2013.01); *G02B 26/004* (2013.01); *G02C 7/085* (2013.01)

(58) Field of Classification Search
   CPC .......... G02B 3/12; G02B 3/14; G02B 26/004; G02B 26/08; G02B 26/0866;
   (Continued)

(56) References Cited

U.S. PATENT DOCUMENTS 5,138,494 A * 8/1992 Kurtin ................. G02B 3/14
                                                      351/158
5,371,629 A * 12/1994 Kurtin ................. G02B 3/14
                                                      351/158
(Continued)

FOREIGN PATENT DOCUMENTS

EP         2860555        4/2015
WO    WO-2013143630 A1 * 10/2013   ............... G02B 3/14
(Continued)

OTHER PUBLICATIONS

Demetri Terzopoulos et al., Modeling Inelastic Deformation: Viscoelasticity, Plasticity, Fracture, 22 Computer Graphics 269-278 (1988), (Year: 1988).*

(Continued)

*Primary Examiner* — James R Greece
(74) *Attorney, Agent, or Firm* — JMB Davis Ben-David

(57) ABSTRACT

Tunable lens (1) comprising a fluidic volume (2), a flexible membrane (3) and a shaping element (4), wherein the membrane (3) delimits the fluidic volume (2) on one side, the shaping element (4) is attached to the membrane (3), the shaping element (4) surrounds an optically active region of the membrane, the shaping element (4) is arranged to alter optical properties of the tunable lens (1) by deflection, in top view the shaping element (4) has a non-circular contour (40), wherein the contour (40) extends within an imaginary circumcircle (10), and the amount of deflection of the shaping element (4) is proportional to a lateral distance of the contour (40) to the circumcircle (10).

9 Claims, 9 Drawing Sheets

(58) Field of Classification Search
CPC ............ G02B 26/0858; G02B 26/0825; G02B 26/00; G02B 2027/0185; G02B 1/06; G02B 7/023; G02B 7/04; G02B 27/0179; H10N 30/20; H10N 30/2048; G02C 7/081; G02C 7/085; G02F 1/294; G02F 2203/28; G02F 2203/18
USPC ........................................................ 359/665
See application file for complete search history.

(56) References Cited

U.S. PATENT DOCUMENTS

| | | | | |
|---|---|---|---|---|
| 5,668,620 | A * | 9/1997 | Kurtin | G02C 7/085 351/158 |
| 6,040,947 | A * | 3/2000 | Kurtin | G02B 3/14 351/159.04 |
| 6,924,792 | B1 * | 8/2005 | Jessop | G02B 26/004 345/48 |
| 7,646,544 | B2 * | 1/2010 | Batchko | H10N 30/2027 359/666 |
| 8,508,436 | B2 * | 8/2013 | Jessop | G09G 3/348 345/204 |
| 2008/0231963 | A1 | 9/2008 | Batchko | |
| 2010/0182703 | A1 | 7/2010 | Bolis | |
| 2020/0341172 | A1 * | 10/2020 | Stevens | G02B 27/0081 |
| 2022/0066239 | A1 * | 3/2022 | Patscheider | G02B 3/14 |

FOREIGN PATENT DOCUMENTS

| | | | | |
|---|---|---|---|---|
| WO | WO-2018028847 | A1 * | 2/2018 | ............ G02C 7/085 |
| WO | 2019186181 | | 10/2019 | |
| WO | WO-2020109605 | A2 * | 6/2020 | ........... G02B 26/004 |
| WO | WO-2020120806 | A1 * | 6/2020 | ........... G02B 26/004 |
| WO | WO-2021137149 | A2 * | 7/2021 | ........... G02B 26/004 |

OTHER PUBLICATIONS

Ulrike Wallrabe, Axicons et al.—Highly Aspherical Adaptive Optical Elements for the Life Sciences, Transducers 251-256 ( 2015). (Year: 2015).*

Justin Ko, Using Integration to Find Arc Lengths and Surface Areas, 2019, pp. 1-7 [online], [retrieved Aug. 8, 2023], retrieved from the Internet (URL: https://www.math.toronto.edu/jko/MAT186_week_12.pdf>. (Year: 2019).*

Gary Heiting, How to Read Your Eyeglasses Prescription, 2019, pp. 1-12 [online], [retrieved Aug. 8, 2023], retrieved from the Internet <URL: https://www.allaboutvision.com/eyeglasses/eyeglass-prescription.htm>. (Year: 2019).*

Projections Onto Subspaces, 2011, pp. 1-4 [online], [retrieved Mar. 16, 2024], retrieved from the Internet <URL: https://ocw.mit.edu/courses/18-06sc-linear-algebra-fall-2011/00e9c8f0eafedeab21a3d079a17ed3d8_MIT18_06SCF11_Ses2.2sum.pdf>. (Year: 2011).*

Eric W. Weisstein, Circumcircle, 2011, pp. 1-7 [online], [retrieved Mar. 16, 2024], retrieved from the Internet <URL: https:// mathworld.wolfram.com/Circumcircle.html>. (Year: 2011).*

Kang Wei et al., A Tunable Liquid Lens Driven by a Concentric Annular Electroactive Actuator, 2014, MEMS 909-912 (2014). (Year: 2014).*

Orientation Independent Coma Compensating Liquid Lens, 2019, pp. 1-53 [online], [retrieved Mar. 18, 2024], retrieved from the Internet <URL: https://priorart.ip.com/IPCOM/000257845>. (Year: 2019).*

The Spring: Hooke's Law and Oscillations, 2017, pp. 1-11 [online], [retrieved Oct. 16, 2024], retrieved from the Internet <URL: https://web.pa.msu.edu/courses/2017spring/PHY251/Lab_10.pdf>. (Year: 2017).*

Dan Liang et al., Flexible Fluidic Lens with Polymer Membrane and Multi-flow Structure, 421 Optics Communications 7-13 (2018). (Year: 2018).*

* cited by examiner

TUNABLE LENS AND METHOD FOR OPERATING A TUNABLE LENS

FIELD

The present disclosure describes tunable lens and a method for operating a tunable lens.

BACKGROUND

A tunable lens described here is based on the following considerations, among others. Tunable lenses having a non-circular contour require a sophisticated control of their tuning states, to achieve good optical quality. Among other things, the tunable lens described here makes use of the idea to design the tunable lens such that deflection of the shaping element depends on the lateral distance between the contour and the imaginary circumcircle. Advantageously, said feature enables a particularly simple control of the shape of the optically active region of the membrane by means of the shaping element.

SUMMARY

The tunable lens is a refractive optical element, which is arranged to interact with electromagnetic radiation, in particular visible light, in a definable manner. For example, the tunable lens is arranged to tune optical properties like optical power and/or cylinder.

The tunable lens comprises a fluidic volume, a flexible membrane and a shaping element. The fluidic volume may be a delimited region, which is at least partially passed through by electromagnetic radiation during normal operation. In particular, the fluidic volume is at least partially delimited by the flexible membrane. The fluidic volume is filled with a fluid which may be in gaseous phase or in liquid phase. In particular the fluidic volume may be filled with a water-based liquid or with an oil-based liquid.

The flexible membrane delimits the fluidic volume on one side. In particular, the fluid is directly adjacent to the flexible membrane. The flexible membrane comprises an optical surface of the tunable lens. At least on optical property is adjustable by changing the shape of the flexible membrane. Here and in the following, the term "flexible" in the context of the membrane describes a property of the membrane which allows the membrane to be bent obliquely to its main plane of extension. In particular, the membrane is expandable. Here and in the following the term "expandable" in the context of the membrane describes a property of the membrane which enables to expand the membrane reversibly along its main plain of extension.

The shaping element is attached to the membrane. The shaping element may have a ring shape. In particular, the shaping element is attached to one surface of the membrane. In particular, the membrane and the shaping element are connected by a material bonded connection. Alternatively, the shaping element and the membrane may be fabricated in a one-piece manner, wherein the shaping element and the membrane are fabricated simultaneously in common fabrication steps. In particular, the shaping element and the membrane may comprise a same material. The main planes of extension of the shaping element and the membrane extend essentially parallel to each other. In a direction perpendicular to the main plane of extension, the thickness of the shaping element is larger than the thickness of the membrane. In particular, the stiffness of the shaping element is larger than the stiffness of the membrane. For example, the shaping element is arranged to transfer forces along the perimeter of the membrane, to control the deflection of the membrane along the perimeter of shaping element in a direction along the optical axis.

The shaping element surrounds an optically active region of the membrane. During intended operation, electromagnetic radiation passes through the optically active region, preferably through the entire optically active region. Here and in the following, the optically active region is a part of the membrane which is dedicated to form an optical surface of the tunable lens. In particular, the deformation of the optically active area is controlled during intended operation in order to adjust the optical properties of the tunable lens. In particular, the shaping element extends continuously perimetrically around the optically active region. The shaping element and the membrane form a common contact surface, which surrounds the optically active region continuously. In particular, the optically active region is directly adjacent to the shaping element. As seen in a top view along the optical axis, the shape of the optically active region is defined by a contour of the shaping element, wherein the contour of the shaping element is defined by the inner edge of the shaping element, which is adjacent to the optically active region.

The shaping element is arranged to alter optical properties of the tunable lens by deflection. The deflection describes a displacement of the shaping element in a direction along the optical axis of the tunable lens. In particular a deflection of the shaping element results in a change of the shape of the membrane, whereby optical properties of the liquid lens are altered. Additionally, or alternatively, the shaping element is arranged to limit the deflection of the membrane, to alter optical properties of the liquid lens in a desired manner.

In top view, the shaping element has a non-circular contour, wherein the contour of the shaping element extends within an imaginary circumcircle. In particular, the optically active region has a non-circular shape as seen in a top view. Preferably the non-circular shape of the optically active region is identical to the shape of the contour of the shaping element. Here and in the following, the "top view" is the perspective perpendicular with respect to the main extension plane of the shaping element in a non-deflected state. For example, the main plain of extension of the shaping element extends perpendicularly with respect to the optical axis. The shaping element may have a non-circular ring-shape seen in a top view. The width of the shaping element seen in a top view may be constant. Alternatively, the width of the shaping element may vary at different positions along the ring. The width of the shaping element is measured along the direction of the radius of the circumcircle. In particular, the contour of the ring is defined by the inner edge of the shaping element, wherein the inner edge faces the optically active area of the membrane. Here and in the following, the circumcircle is an imaginary circle which completely surrounds the contour of the shaping element, while having a minimum radius. In particular, the circumcircle may intersect the shaping element, because the inner edge of the circumcircle defines the contour.

When tuning the lens, the amount of deflection of the shaping element is proportional to a lateral distance of the contour to the circumcircle. The lateral distance is measured along the main plain of extension of the shaping element. Here and in the following, the lateral distance is measured in the direction of the radius of the circumcircle. In particular, when altering the optical properties of the tunable lens, the deflection of a section of the shaping element increases with increasing lateral distance.

According to one embodiment, the tunable lens comprises the fluidic volume, the flexible membrane, and the shaping element. The membrane delimits the fluidic volume on one side, the shaping element is attached to the membrane and the shaping element surrounds an optically active region of the membrane. The shaping element is arranged to alter optical properties of the tunable lens by deflection, in particular in a direction along the optical axis of the tunable lens. In top view the shaping element has a non-circular contour, wherein the contour of the shaping element extends within an imaginary circumcircle, and the amount of deflection of the shaping element is proportional to a lateral distance of the shaping element to the circumcircle. In particular, the shaping element is arranged such that essentially all points of the shaping element lie on the surface of an imaginary spherical surface. In particular, the radius of curvature of said spherical surface changes when altering the optical properties.

According to one embodiment, the shaping element is arranged such that a contour of the shaping element lies on the surface of an imaginary spherical surface, wherein a radius of curvature of the imaginary spherical surface changes when altering the optical properties of the tunable lens. In particular, the optically active area of the membrane extends along the same imaginary spherical surface.

According to one embodiment, the tunable lens comprises an actuator, wherein the actuator is arranged to apply a deflection force to the shaping element. The deflection force is applied to multiple deflection points of the shaping element, wherein the absolute value of the deflection force applied at each deflection point is proportional to a lateral distance of the deflection point to the circumcircle. In particular, the deflection force is applied non-uniformly at multiple discrete deflection points. A retention force may act against the deflection force, wherein the retention force may be derived from the elasticity of the shaping element and/or the membrane. In particular, the retention force may vary along the perimeter of the shaping element.

For example, the actuator comprises an electromagnetic unit, a thermomechanical unit, a piezoelectric unit, a magnetostrictive unit, an electrohydrodynamic unit, an electrostatic unit, a phase-change unit, a shape memory unit, an electrorhelological unit, diamagnetic unit, a magnetic unit and/or a manual unit which is arranged to generate at least a part of the deflection force. The deflection force may be generated by separate units for each deflection point. Alternatively, one of the units may generate the deflection force, which is applied to multiple deflection points. The portion of the deflection force applied to each of the deflection points may depend on the lateral distance of the deflection point to the circumcircle. The deflection points may be distributed along the shaping element. In particular, the deflection points are separated from each other. For example, the deflection force applied to each of the deflection points is individually controllable.

According to one embodiment, the tunable lens comprises a mount, wherein the mount is arranged to apply a retention force to the shaping element. The retention force is applied to multiple retention points of the shaping element, wherein the absolute value of the retention force applied at each retention point is proportional to a lateral distance of the retention point to the circumcircle, and the retention force acts in an opposite direction of the deflection force. In particular, the retention force force is applied non-uniformly at multiple discrete retention points. For example, the mount is a ring-shaped element. In a top view, the mount may have essentially the same shape at the shaping element. In particular, the inner edge of the mount may have the same shape as the contour of the shaping element.

The mount may be essentially rigid. In particular, the mount is arranged to not be deflected due to deflection of the shaping element. At the retention points, the mount is mechanically coupled to the shaping element. The mount may be coupled by directly attaching the shaping element at the retention point to the mount. In particular, the mount is directly attached to the shaping element at retention points which essentially lie on the imaginary circumcircle. Alternatively, the mount may be coupled to retention points of the shaping element by means of an elastic element.

According to one embodiment the deflection force applied to one of the deflection points is larger for larger lateral distances of the deflection point to the circumcircle and/or the retention force applied to one of the deflection points is smaller for larger lateral distances of the retention point to the circumcircle.

According to one embodiment the deflection points are arranged at distal regions of the shaping element, wherein at distal regions the shaping element has a local maximum lateral distance to the circumcircle, and/or the retention points are arranged at proximal regions of the shaping element, wherein at proximal regions the shaping element has a local minimum lateral distance to the circumcircle. In particular, the shaping element comprises sections without retention points and without deflection points, wherein the deflection of the shaping element in said sections adapts to the deflection at adjacent deflection points and/or retention points.

According to one embodiment, the retention points and the deflection points are arranged alternatingly along the perimeter of the shaping element. For example, multiple deflection points, in particular all deflections points, have a same lateral distance to the imaginary circumcircle. Multiple retention points, in particular all retention points may have a same lateral distance to the imaginary circumcircle. Advantageously, said arrangement of deflection points and retention points simplifies the deflection of the shaping element at the deflection points and retention points.

According to one embodiment, the actuator comprises a lever. Multiple deflection points or retention points are coupled to the lever at different coupling positions along the lever, wherein the deflection of the shaping element depends on the respective coupling position assigned to the deflection point or the retention point. Seen in a top view, the lever extends along an outer edge of the shaping element, wherein the outer edge faces away from the optically active surface.

In particular, the lever is attached to a pivot point, wherein the lever is arranged to rotate around the pivot point. At the coupling position, the lever transfers a tensile force to the respective deflection point. In particular, the lever is arranged to exclusively transfer tensile forces through the coupling points. In particular, the tunable lens comprises multiple levers, wherein seen in a top view the levers as a whole extend completely around the shaping element. Coupling elements connect each coupling point with at least one deflection point or retention point. In particular, the coupling elements are arranged to allow in-plane rotational movement of the shaping element with respect to the mount.

Here and in the following, an in-plane rotational movement describes a rotation of the shaping element in its main extension plane, wherein the center of rotation is within the contour of the shaping element.

According to one embodiment at least one of the deflection points is coupled to the actuator by means of an elastic element, and/or at least one of the retention points is coupled to the mount by means of an elastic element. The absolute value of the retention force and/or absolute value of the deflection force applied to said at least one deflection point or applied to said at least one retention point is proportional to the stiffness of the respective elastic element. In particular, the actuator is arranged to provide a single stroke, wherein the single stroke is transferred to multiple deflection points, wherein the deflection of the deflection points depends on the stiffness of the elastic element coupled to the actor and/or the actuator deflects the lever, wherein the deflection of the deflection points depends on the respective coupling point assigned to the deflection points. In particular the coupling element may be one of the elastic elements, whereby the deflection of the deflection points depends on both, the coupling position assigned to the respective deflection point and the stiffness of the elastic element.

According to one embodiment, the actuator is arranged to apply a deflection force to the shaping element, wherein the deflection force is applied uniformly to the shaping element, a retention force acts against the deflection force, wherein the absolute value of the retention force is proportional to the lateral distance of the contour to the circumcircle. In this context, a force which is applied uniformly describes a force which is constant along the perimeter of the shaping element. For example, the actuator is a hydraulic or pneumatic actuator, wherein the actuator is arranged to apply a pressure to the shaping element. The retention force may be defined by means of the stiffness of the shaping element. Alternatively, or additionally the retention force may be based on the stiffness of the shaping element. In particular the stiffness of the shaping element may vary along the perimeter of the shaping element. The retention force may be applied at distinct retention points by means of a mechanical connection to the mount. In particular, the retention force depends on the stiffness of the elastic element the respective retention point to the shaping element.

According to one embodiment, at least one of the deflection force or the retention force is applied non-uniformly. For example, the deflection force is be applied uniformly and the retention force is applied non-uniformly, or the retention force is applied uniformly, and the deflection force is applied non-uniformly, or both the deflection force and the retention force are applied non-uniformly. Here and in the following, a force which acts uniformly is a force which is constant along the perimeter of the shaping element. Here and in the following, a force which acts non-uniformly is a force which varies along the perimeter of the shaping element. In particular, a force which is applied non-uniformly is applied at discrete points along the perimeter of the shaping element.

According to one embodiment the fluidic volume comprises a lens chamber and a reservoir, wherein the lens chamber and the reservoir are filled with a fluid. The membrane delimits the lens chamber, and the actuator is arranged to generate the deflection force by moving fluid between the lens chamber and the reservoir. In particular, the actuator is a pumping means, which is arranged to pump fluid between the lens chamber and the reservoir. In particular, pumping the liquid causes the deflection of the shaping element and not vice versa.

According to one embodiment, the actuator is arranged to apply the deflection force to the shaping element on a side opposed to the membrane. In particular, the actuator comprises a fluidic chamber, wherein the fluidic chamber is adjacent to the shaping element. By increasing the pressure in the fluidic chamber, the deflection force is applied uniformly to the shaping element.

A method for operating a tunable lens is further disclosed. In particular, the method can be used to operate a tunable lens described herein. That is, all features disclosed for the tunable lens are also disclosed for the method and vice versa.

According to one embodiment, the tunable lens comprises a flexible membrane and a shaping element, wherein the membrane forms an optical surface of the tunable lens and the shaping element is attached to the membrane. The shaping element has a non-circular ring contour in top view and the shaping element surrounds an optically active region of the membrane. The deformation of the membrane when tuning the lens is controlled by the deflection of the shaping element in a direction along the optical axis, wherein the contour of the shaping element extends within an imaginary circumcircle, and the amount of deflection of the shaping element is proportional to a lateral distance of the contour to the circumcircle.

For tuning the tunable lens, the curvature of the membrane in the optically active region is altered. The curvature of the membrane in optically active region is altered by controlling the position of the lens shaping element along the optical axis. In particular, the lens shaping element is flexible, so that the deflection of the lens shaping element may vary along the perimeter of the lens shaping element in a non-linear fashion. For example, the deflection of the shaping element is controlled such that the position of the shaping element along the optical axis has at least one maximum and/or at least one minimum.

According to one embodiment, the deflection of the shaping element is controlled such that the contour of the shaping element lies on an imaginary surface of a spherical segment, wherein the radius of curvature of said surface of the spherical section alters, when the tunable lens is tuned. In particular, the dependency of the deflection h along the optical axis on the lateral distance d between the contour and the circumcircle is described as follows:

$$h(d) = r - \sqrt{r^2 - (a-d)r^2}$$

wherein r is the radius of curvature of the optically active region and a is the radius of the circumcircle. For different tuning states, the radius of curvature r is changed. The radius of the circumcircle a is given by the shape of the contour. The lateral distance d between the contour and the circumcircle changes along the perimeter of the contour and is given by the shape of the contour.

According to one embodiment, a deflection force is applied to the shaping element and a retention force is applied to the shaping element, wherein the retention force and the deflection force act in opposite directions along the optical axis. The deflection force is applied uniformly to the shaping element and the absolute value of the retention force is proportional to a lateral distance of the contour to the circumcircle. Here and in the following, applying the retention force uniformly describes a method in which the retention force is applied homogeneously to the shaping element. In other words, the pressure (force per area) is essentially homogeneous along the perimeter of the shaping element. However, there may be a gradient of the pressure in a direction perpendicular with respect to the perimeter of the shaping element. In particular, the retention force is defined by the stiffness of the shaping element, wherein the stiffness varies along the perimeter of the shaping element. In particular, the retention force is applied to discrete retention points, wherein the retention force applied to each retention point controlled to achieve the desired deflection of the shaping element According to one embodiment, a deflection force is applied to the shaping element and a retention force is applied to the shaping element, wherein the retention force and the deflection force act in opposite directions along the optical axis. The deflection force is applied to discrete deflection points on the shaping element and the absolute value of the deflection force at each deflection point is proportional to a lateral distance of the deflection point to the circumcircle and/or the absolute value of the retention force is proportional to a lateral distance of the shaping element to the circumcircle. For example, the retention force is applied to discrete retention points, wherein the retention points are distributed along the perimeter of the shaping element.

According to one embodiment the tunable lens comprises a fluidic volume, a flexible membrane and a shaping element, wherein the membrane delimits the fluidic volume on one side and the shaping element is attached to the membrane. The shaping element surrounds an optically active region of the membrane, wherein the shaping element is arranged to alter optical properties of the tunable lens by deflection, and in top view the shaping element has a non-circular contour.

According to one embodiment the optical properties are sphere, cylinder power and cylinder axis.

Here and in the following, meridians of the tunable lens describe imaginary straight lines extending through the center of the circumcircle, wherein different meridians extend at an angle with respect to each other.

Sphere (abbreviated as SPH) indicates the amount of lens power, measured in diopters of focal length. The deflection of the membrane for sphere is equal in all meridians of the tunable lens. The tunable lens is arranged to alter the lens power by a definable deformation of the membrane.

Cylinder (abbreviated as CYL) power indicates the lens power for astigmatism of the tunable lens. The membrane has a non-spherical surface shape for generating cylinder power. In particular, for generating cylinder power the membrane has a shape so that along a first meridian the membrane has no added curvature, and along a second meridian the membrane has the maximum added curvature, wherein the first meridian and the second meridian extend perpendicular with respect to each other. The tunable lens is arranged to alter the curvature of the membrane along the second meridian.

Cylinder axis describes the angle of the first meridian, which has no added curvature to correct astigmatism. In other words, the cylinder axis is the angle of the first lens meridian that is 90 degrees away from the second meridian, wherein the second meridian contains the cylinder power. The cylinder axis is defined with an angle from 1° to 180°. The tunable lens may be arranged to alter the cylinder axis from 1° to 180° angle.

In particular, optical properties are prism power and prism axis and add. Prism power is the amount of prismatic power of the tunable lens, measured in prism diopters ("p.d." or a superscript triangle). Prism power is indicated in either metric or fractional English units (0.5 or ½, for example). Prism corresponds to a tilt of the membrane's surface with respect to the optical axis. Prism power defines absolute of the angle by which the membrane's surface is tilted. The tunable lens may be arranged to alter the prism power.

Prism axis is the direction of prismatic power of the tunable lens. The prism axis indicates the angle of the meridian around which the surface of the tunable lens is tilted with respect to the optical axis. The prism axis may extend along any meridian. The prism axis may be defined by an angle from 1° to 360°. The tunable lens may be arranged to alter the prism axis from 1° to 360°.

Add is the added magnifying power applied to a portion of the tunable lens. In particular, a tunable lens with Add is a multifocal lens. The added magnifying power may range from +0.75 to +3.00 diopters.

According to one embodiment the tunable lens comprises at least five actuation points, wherein at each actuation point is a deflection point, a retention point or both. Preferably, the tunable lens comprises at least six actuation points, highly preferred at least eight actuation points. At the actuation points the deflection force and/or the retention force is transferred to the shaping element. In particular, at the actuation point the position of the shaping element along the optical axis is definable by the deflection force and/or the retention force. For example, the actuation points are discrete points, wherein the shaping element adapts its position along the optical axis to the deflection of the neighboring actuation points.

According to one embodiment the actuation points are distributed along the perimeter of the shaping element and seen in a top view the curvature of the contour has a local extremum or is zero at the actuation points. In particular, the curvature is measured within the main plane of extension of the shaping element. In other words, the varying curvature of the contour results from the non-circular shape of the shaping element. For example, at the actuation points the shaping element has a local maximum curvature, a local minimum curvature or zero curvature.

According to one embodiment the actuation points are distributed along the perimeter of the shaping element and seen in a top view the curvature of the contour has a same value at the actuation points. In particular, the curvature of the contour has a same absolute value at the actuation points.

According to one embodiment, the actuation points are distributed along the perimeter of the shaping element, wherein the actuation points are distributed at distances of equal arc lengths along the perimeter with respect to each other. The arc length along the perimeter is a length measured along the contour of the shaping element.

According to one embodiment, the actuation points are distributed along the perimeter of the shaping element, wherein the actuation points have an equal angel distance with respect to each other. The angel is measured with respect to the center of the circumcircle. The angel distance may b for example 72°, 60° or 45°.

According to one embodiment, the contour of the shaping element is point-symmetric, and at least two of the actuation points are arranged on opposite sides of the shaping element with respect to a point of symmetry of the contour. The point of symmetry may coincide with the center of the circumcircle.

According to one embodiment, the actuation points which are arranged on opposite sides of the shaping element have the same deflection in each tuning state. In particular, the tunable lens is arranged to alter sphere and/or cylinder power and/or prism axis.

BRIEF DESCRIPTION OF THE DRAWINGS

Further advantages and advantageous embodiments and further embodiments of the tunable lens result from the following embodiment examples shown in connection with the figures.

It shows.

DETAILED DESCRIPTION

Elements which are identical, similar or have the same effect are given the same reference signs in the figures. The figures and the proportions of the elements shown in the figures to one another are not to be regarded as to scale. Rather, individual elements may be shown exaggeratedly large for better representability and/or for better comprehensibility.

Figure 1:
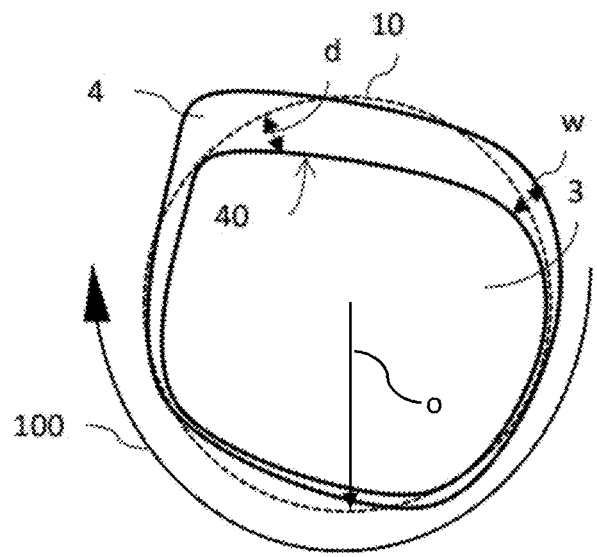
FIG. 1 an exemplary embodiment of a shaping element of a tunable lens in top view.

FIG. 1 shows an exemplary embodiment of a shaping element 4 of a tunable lens 1 in top view. Here and in the following the top view is along the optical axis 12 of the tunable lens 1. The shaping element has a non-circular ring shape, and the inner edge of the shaping element 4 defines a contour 40. The shaping element 4 is connected to a membrane 3 and circumvents an optically active area of the membrane 3.

The shaping element 4 extends within an imaginary circumcircle 10. The circumcircle 10 is a circle surrounding the shaping element 4, in particular the contour 40, within the main extension plane of the shaping element 4, wherein the circumcircle 10 has the smallest radius possible. A lateral distance d between the circumcircle 10 and the contour 40 varies along a perimeter 100 of the shaping element 4. The lateral distance is measured along the radius o the circumcircle 10. The shaping element 4 has a width w which varies along the perimeter 100 of the shaping element 4. The width w is measured in a direction along the radius of the circumcircle 10.

Figure 2:
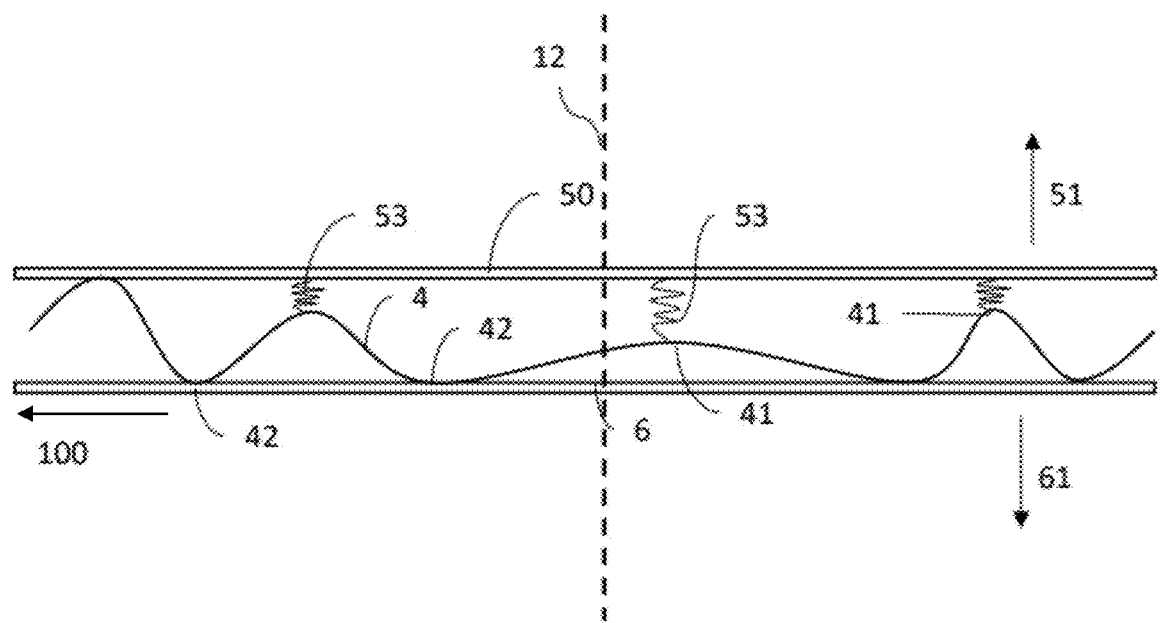
FIG. 2 an exemplary embodiment of a tunable lens in a view perpendicular to a perimeter of the shaping element.

FIG. 2 an exemplary embodiment of a tunable lens 1 in a schematic view perpendicular to the perimeter 100 of the shaping element 4. The shaping element 4 is attached to a mount 6 and a carrier 50, wherein the mount 6 and the carrier 50 are arranged on opposite sides of the shaping element long the optical axis 12 of the tunable lens 1. For example, the mount 6 and/or the carrier 50 has the same shape as the shaping element 4 or is congruent to the shaping element 4. For tuning the tunable lens 1, the carrier 50 is moved along the optical axis 12 by means of an actuator 5. The carrier 50 applies a displacement force 51 to the shaping element 4. The mount 6 essentially maintains its position along the optical axis 12 when the tunable lens 1 is actuated. The mount 6 is arranged to apply a retention force 61 to the shaping element 4. The retention force 61 acts in an opposite direction as the deflection force 51.

The shaping element 4 comprises deflections points 41 and retention points 42. At the deflection points 41 at least a portion of the deflection force 51 acts on the shaping element. At the retention points at least a portion of the retention force 61 acts on the shaping element 4. At the displacement points 41 and the retention points 42, the shaping element 4 may be directly attached to the carrier 50 and the mount 6 or the shaping element 4 may be attached to the mount 6 and the carrier 50 by means of elastic elements 53. In particular, the retention points 42 and the deflection points 41 are spaced apart from one another. For example, the retention points 42 and the deflection points 41 are arranged alternatingly along the perimeter 100 of the shaping element 4. The retention force 61 and the deflection force 51 are applied such that the deflection of the shaping element 4 along the optical axis 12 is proportional to the lateral distance d between the shaping element 4 and the circumcircle 10. In particular, for larger lateral distances d, the deflection of the shaping element 4 increases.

Figure 3:
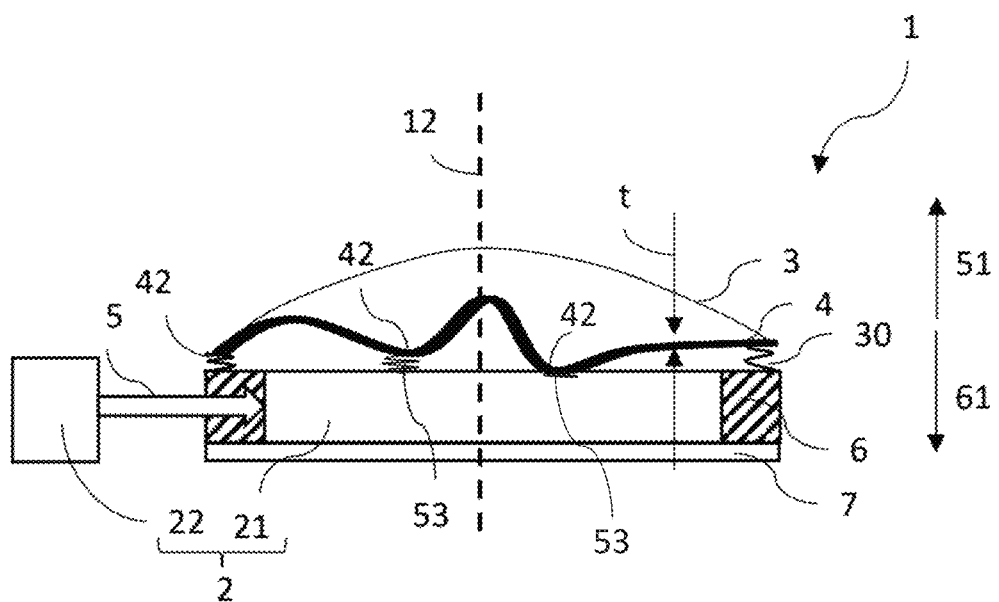
FIG. 3 exemplary embodiments of tunable lenses in a schematic sectional view.

FIG. 3 shows an exemplary embodiment of tunable lens 1 in a schematic sectional view. The Tunable lens 1 comprising a fluidic volume 2, the flexible membrane 3 and the shaping element 4. The membrane 3 delimits the fluidic volume 2 on one side along the optical axis 12. The shaping element 4 is attached to the membrane 3 and the shaping element 4 surrounds an optically active region of the membrane 3. The shaping element 4 is arranged to alter optical properties of the tunable lens 1 by deflection along the optical axis 12. In top view the shaping element 4 has a non-circular contour 40, wherein the contour 40 extends within an imaginary circumcircle 10, and the amount of deflection of the shaping element 4 is proportional to a lateral distance d of the contour 40 to the circumcircle 10.

For controlling the tunable lens 1, the deflection force 51 is applied to the shaping element 4 and the retention force 61 is applied to the shaping element 4, wherein the retention force 61 and the deflection force 51 act in opposite directions along the optical axis 12. The deflection force 51 is applied uniformly to the shaping element 4 and the absolute value of the retention force 61 is proportional to a lateral distance d of the contour 40 to the circumcircle 10.

The tunable lens 1 comprises an actuator 5, wherein the actuator 5 is arranged to apply the deflection force 51 to the shaping element 4. The deflection force 51 is applied uniformly to the shaping element 4. The deflection force 51 acts in an opposite direction of the retention force 61, and the absolute value of the retention force 61 is proportional to the lateral distance d of the contour 40 to the circumcircle 10.

Tunable lens 1 comprises the mount 6, which is arranged to apply the retention force 61 to the shaping element 4. In a top view, the mount 6 may have a ring shape, in particular a non-circular ring shape. The retention force 61 is applied to multiple retention points 42 of the shaping element 4, wherein the absolute value of the retention force 61 applied at each retention point 42 is proportional to a lateral distance d of the retention point 42 to the circumcircle 10. The retention points 42 may be connected to the mount 6 by means of an elastic element 53, which transfers the retention force 61 to the shaping element 4. In particular, the portion of the retention force 61 which is transferred via the elastic element 53 depends on the stiffness of the elastic element 53. The retention points 42 may be directly attached to the mount 6.

The retention force 61 may at least partially result from the elastic modulus of the shaping element. The elastic modulus of the shaping element 4 may vary along the perimeter of the shaping element 4. For example, the shaping element 4 has a thickness t, wherein the thickness t is measured along the optical axis 12. The thickness t varies along the perimeter 100 of the shaping element 4, which results in a variation of the elastic modulus of the shaping element 4 along the perimeter 100. In particular the elastic modulus of the shaping element 4 is proportional to the lateral distance d of the shaping element 4. In particular, with increasing lateral distance d the elastic modulus of the shaping element decreases along the perimeter 100. Thus, the thickness t of the shaping element 4 may be proportional to the lateral distance d. In particular, the thickness t increases with decreasing lateral distance d along the perimeter 100.

The fluidic volume 2 comprises a lens chamber 21 and a reservoir 22, wherein the lens chamber 21 and the reservoir 22 are filled with a fluid. In particular the lens chamber 21 and the reservoir 22 are filled with the same fluid. The fluid may be water-based-oil-based or may be in a gaseous phase. In particular, the refractive index of the fluid differs from the refractive index of a material, which is arranged on an opposite side of the membrane 3. The membrane 3 delimits the lens chamber 21, and the actuator 5 is arranged to generate the deflection force 51 by moving fluid between the lens chamber 21 and the reservoir 22. In particular, the actuator comprises a pumping unit, which alters the pressure in the lens chamber 21, to change the tuning state of the tunable lens. The deflection force is applied uniformly to the shaping element 4 by increasing the pressure in the lens chamber 21. The lens chamber is delimited by the membrane 3, the mount 6, a window element 7 and a bellows 30. The bellows 30 connects the mount 6 and the shaping element and/or the membrane 3 in a liquid-tight fashion. The bellows 30 may be integrally formed with the membrane. In particular, the elastic element(s) may be integrally formed with the bellows 30. The bellows may be a folded membrane, which enables a displacement of the shaping element 4 along the optical axis 12 with respect to the mount 6.

Figure 4:
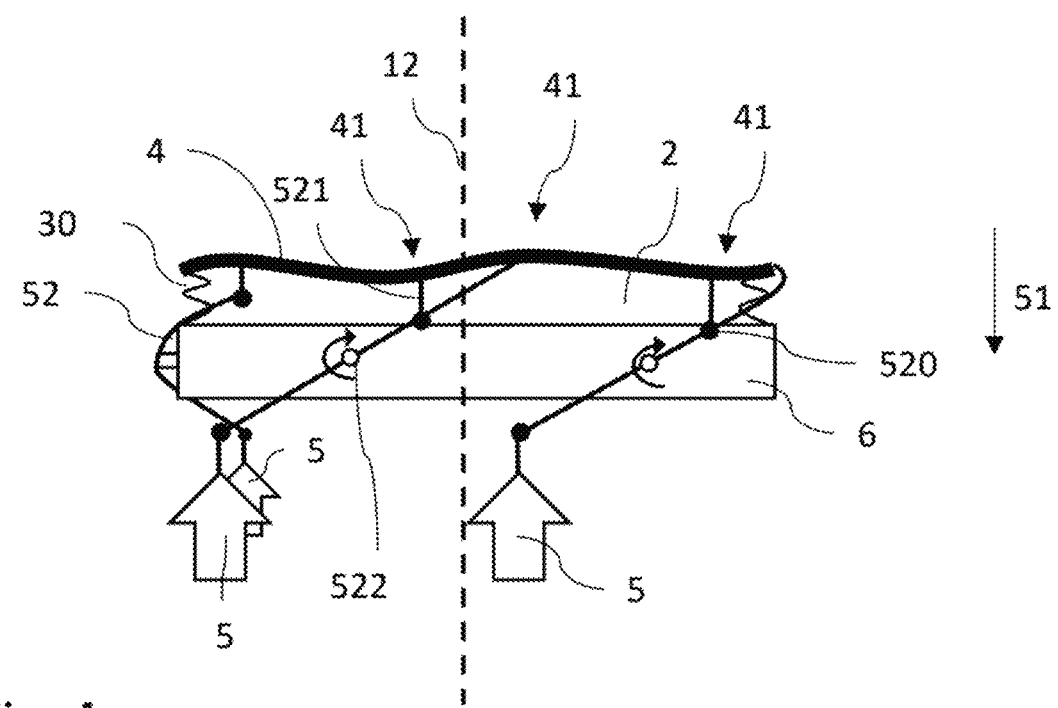
FIGS. 4 and 5 exemplary embodiments of tunable lenses in a side view.

FIG. 4 shows an exemplary embodiment of a tunable lens 1 in a schematic side view. The actuator 5 comprises a lever 52, and multiple deflection points 41 are coupled to the lever 52 at different coupling positions 520 along the lever 52. The deflection of the shaping element 4 depends on the respective coupling position 520. The lever 52 is rotatably attached to the mount 6 by means of a pivot point 522. Coupling elements 521 transfer the deflection force 51 between the coupling points and the deflection points 41. In particular, the coupling elements 521 allow relative movement of the deflection points 41 with respect to the couplings points 520 in directions perpendicular to the optical axis 12. In particular, the coupling elements 521 are arranged to solely transfer tensional forces between the lever 52 and the shaping element 4.

In particular, the coupling element 521 may be an elastic element 53 having a dedicated elastic modulus. At least one of the retention points 42 is coupled to the mount 6 by means of an elastic element 53, wherein absolute value of the deflection force 51 applied to said at least one deflection point 41 is proportional to the stiffness of the respective elastic element 53.

Figure 5:
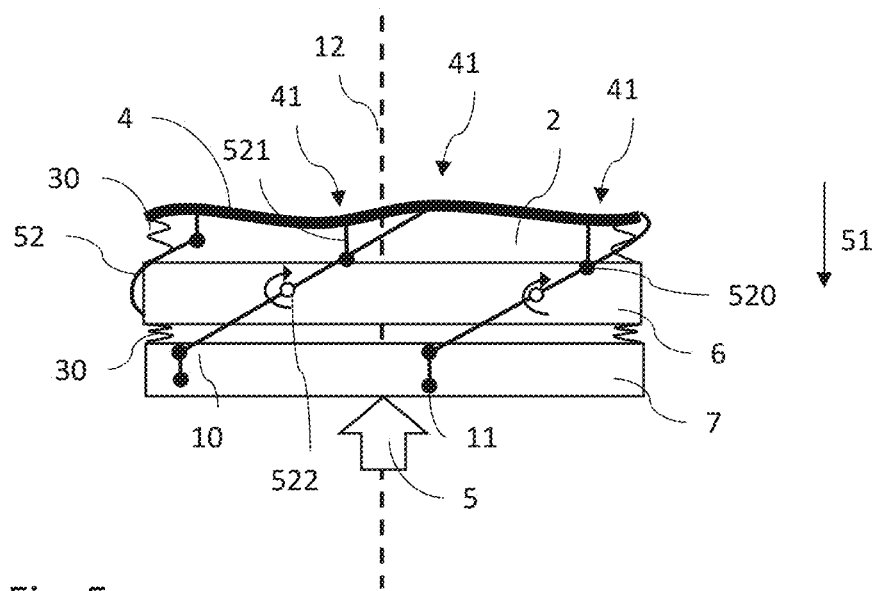

FIG. 5 shows an exemplary embodiment of the tunable lens 1 in a schematic side view. The tunable lens 1 comprises levers 52, which are respectively attached to the mount 6 by means of the pivot point 522. The levers 52 are coupled to the window element and to the shaping element 4 by means of coupling elements 521. The actuator 5 is arranged to apply a force to the window element 7, whereby the window element 7 is displaced with respect to the mount 6. The window element 7 and the mount 6 are connected by means of a bellows 30 in a liquid-tight manner. The movement of the window element 7 causes a rotation of the levers 52 around the pivot points 522. The rotation of the levers 52 results in a displacement force 51 acting on displacements points 41 of the shaping element 4. The position of the coupling points 520 assigned to each deflection point 41, defines the stroke of each displacement point 41 along the optical axis.

Figure 6:
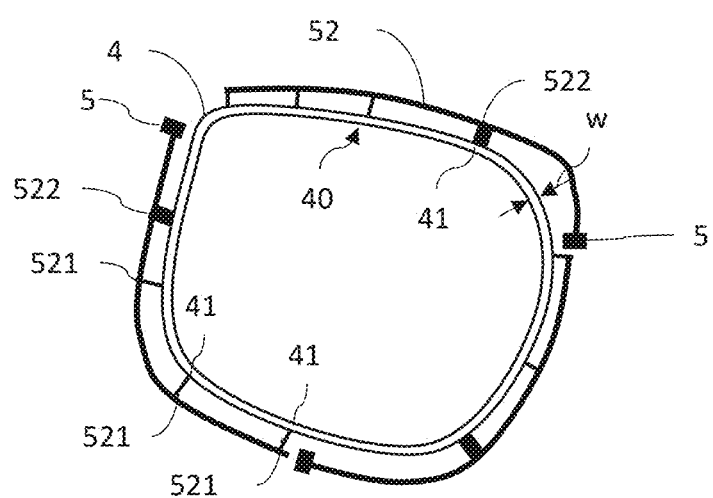
FIG. 6 an exemplary embodiment of a tunable lens in top view.

FIG. 6 shows an exemplary embodiment of a tunable lens 1 in a schematic top view along the optical axis 12. The shaping element 4 has a uniform width w. The levers 52 respectively extend along an outer edge of the shaping element 4, wherein the outer edge is opposed to the contour 40. Each lever 52 is coupled to the actuator 5, to the mount 6 by means of a pivot point 522 and to the shaping element by means of the coupling elements 521.

Figure 7:
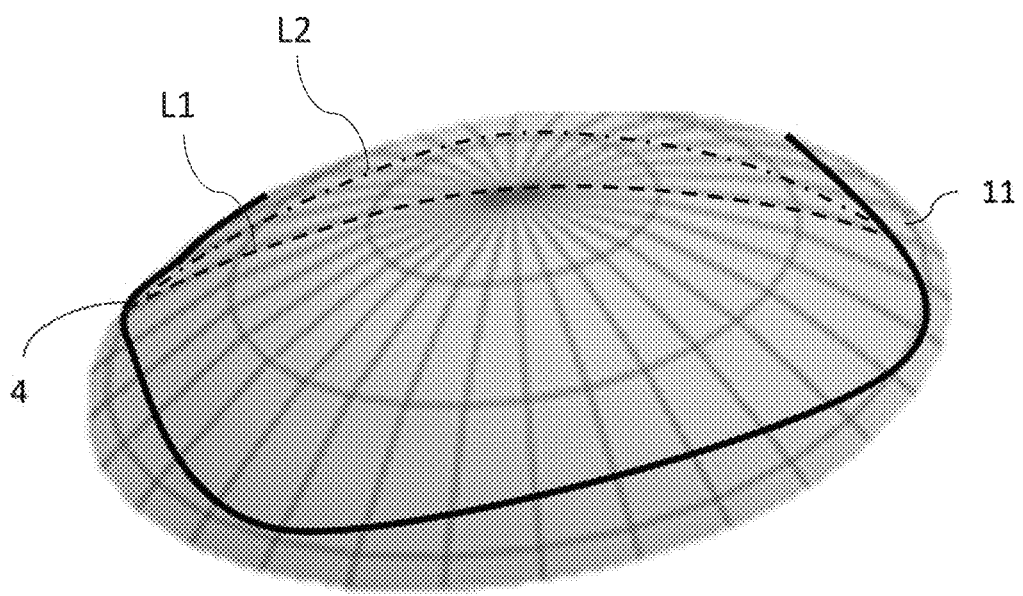
FIGS. 7 and 8 exemplary embodiments of shaping elements of tunable lenses in a schematic perspective view.

FIG. 7 shows an exemplary embodiment of a shaping element 4 of a tunable lens 1 in a schematic perspective view in one specific tuning state. The shaping element 4 has a non-circular contour. The deflection of the shaping element 4 is controlled such that the contour 40 of the shaping element 4 lies on a surface 11 of an imaginary spherical segment. When tuning the tunable lens 1, the radius of curvature of the imaginary spherical segment changes as indicated with the dashed line L1 and dashed-dotted line L2 in FIG. 7. In particular, the radius of curvature of the imaginary spherical segment decreases (dashed-dotted line L2), when the optical power of the tunable lens increases.

Figure 8:
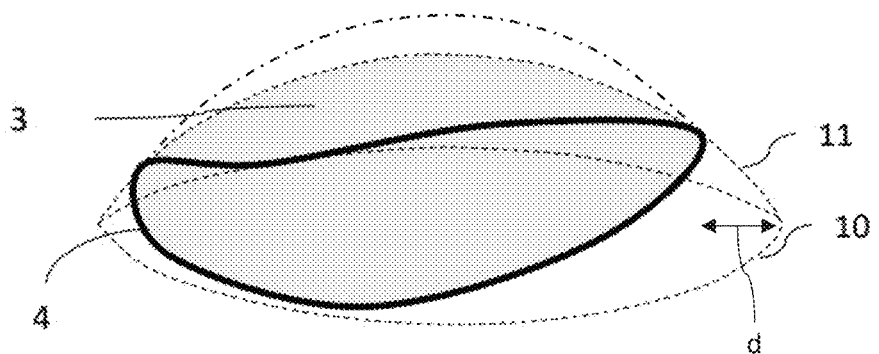

FIG. 8 shows an exemplary embodiment of a shaping element 4 of a tunable lens 1 in a schematic perspective view in one specific tuning state. The shaping element surrounds an optically active region of the membrane 3. The shaping element 4 is controlled such that the contour of the shaping element 4 lies on the surface 11 of the imaginary spherical segment. In particular, the optically active region of the membrane extends along the surface 11 of the imaginary spherical segment.

Figure 9:
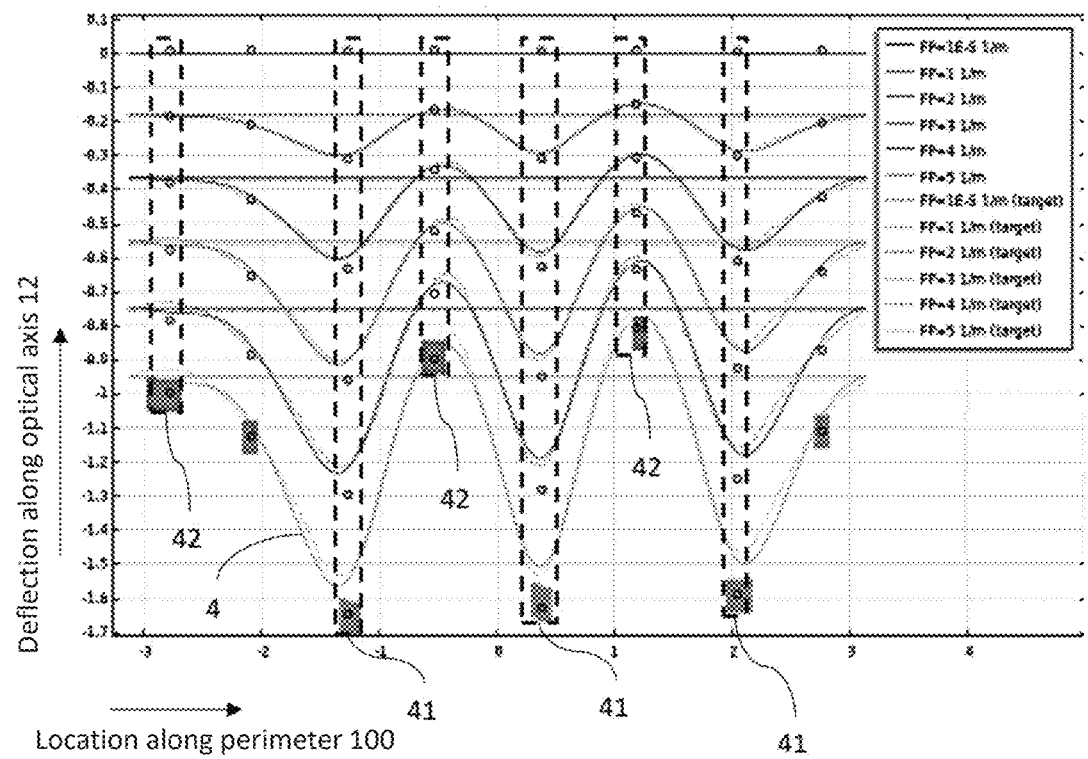
FIG. 9 a graph showing deflection of an exemplary embodiment of the shaping element for different tuning states.

FIG. 9 depicts a graph showing deflection of an exemplary embodiment of the shaping element 4 for different tuning states. The deflection of the shaping element 4 along the optical axis 12 is plotted against the perimeter 100 of the shaping element 4. Each curve represents the deflection of the shaping element 4 in one tuning state. From top to bottom, the optical power of the tunable lens 1 increases, wherein the deflection of the shaping element 4 along the optical axis 12 increases. In the graph, a single deflection point 41 or a single retention 42 point is enclosed by a dashed line. When tuning the tunable lens 1 towards higher optical power, the distance of deflection points and retention points along the optical axis increases. The deflection points 41 may be commonly connected to the carrier 50, whereby the deflection points have a same position along the optical axis 12 for each tuning state. The retention points 42 may be commonly connected to the mount 6, whereby the retention points 42 have a same position along the optical axis 12 for each tuning state. For example, in between the retention points and the deflection points, the position of the shaping element 4 along the optical axis 12 is not defined.

Figure 10:
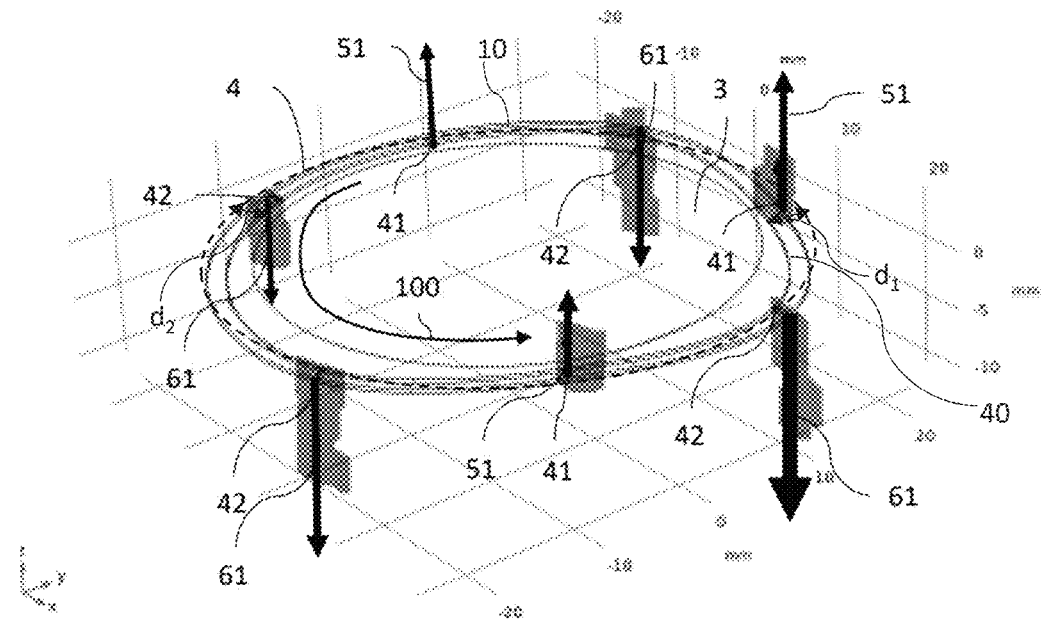
FIG. 10 the exemplary embodiment of the shaping element described in FIG. 9 in a schematic perspective view.

FIG. 10 shows the exemplary embodiment of the shaping element 4 described in FIG. 9 in one tuning state in a schematic perspective view. The deflection points 41 and the retention points 42 are arranged along the perimeter 100 spaced apart from one another. Alternatively, at least some of the retention points 42 and some of the deflection points 41 may coincide. Furthermore, the deflection force 51 and or the retention force may be applied extensively to the shaping element 4. Also shown is a lateral distance di of a deflection point 41 to the circumcircle 10 and a lateral distance d2 of a retention point 42 to the circumcircle 10.

Figure 11:
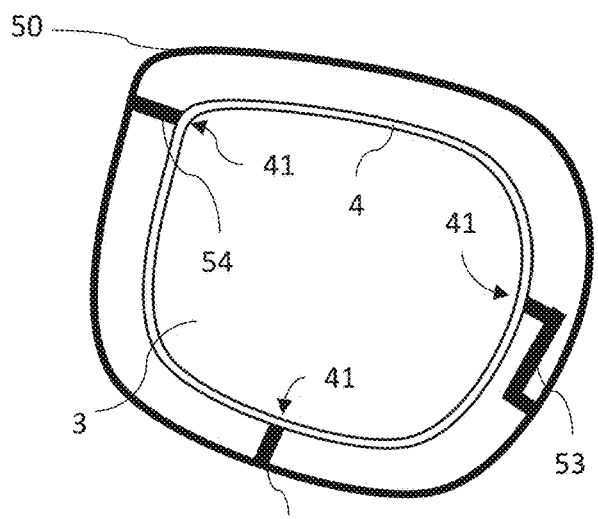
FIGS. 11, 12 and 13 an exemplary embodiment of a tunable lens having a carrier and a mount which are connected to the shaping element in a schematic top view.
Figure 12:
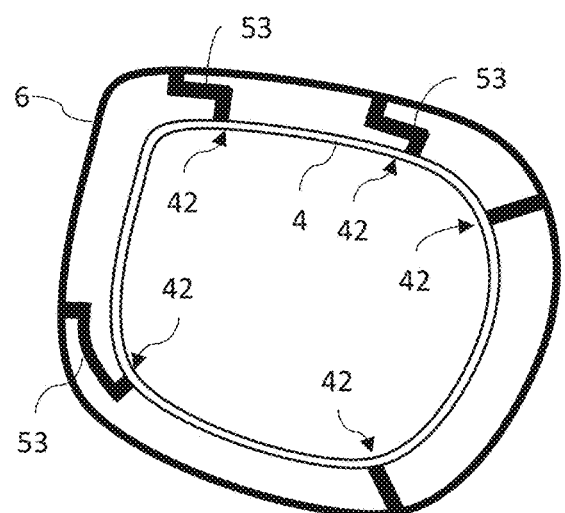
Figure 13:
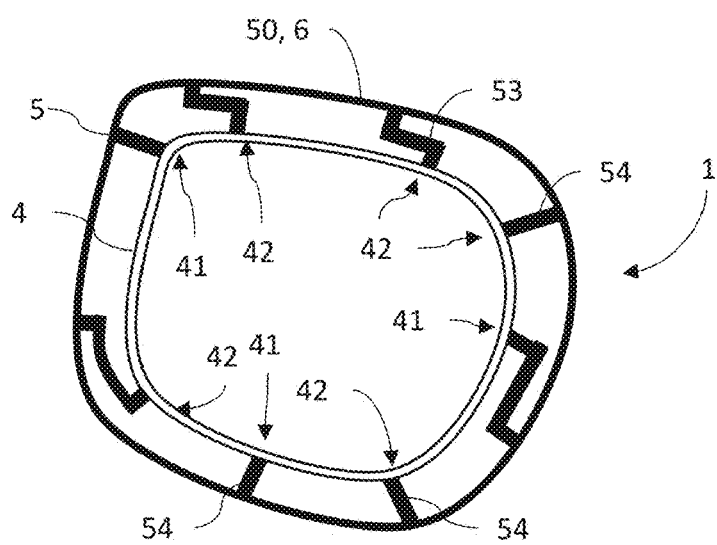

FIGS. 11, 12 and 13 show an exemplary embodiment of a tunable lens 1 having a carrier 50 and a mount 6 which are connected to the shaping element 4 in a schematic top view.

FIG. 11 shows solely the carrier 50, which is connected to the deflection points 41 by means of links 52 and by means of an elastic element 53. The elastic element is a bending beam structure. The stiffness of the elastic element 53 depends on the geometry of the bending beam structure. The links 54 provide a stiff connection between the carrier 50 and the shaping element 4. Thus, the deflection of the carrier 50 corresponds the deflection of the shaping element 4 at the deflection point 41 which is connected by means of the link 54. In particular, the carrier 50 is connected to the shaping element 4 by means of links 54 at deflection points 41, wherein the lateral distance d between the contour 40 and the circumcircle 10 has a local maximum.

FIG. 12 shows solely the mount 6, which is connected to the retention points 42 by means of links 52 and by means of the elastic elements 53. The elastic elements 53 are bending beam structures. The stiffness of the elastic elements 53 depends on the geometry of the bending beam structures. The links 54 provide a stiff connection between the mount 6 and the shaping element 4. Thus, the deflection of the mount 6 corresponds the deflection of the shaping element 4 at the retention point 42 which is connected by means of the link 54. In particular, the mount 6 is not deflected for tuning the tunable lens 1. Thus, the retention points 42 connected by means of the link 54 remain at the same position for every tuning state. In particular, the carrier mount 6 is connected to the shaping element 4 by means of links 54 at retention points 42, wherein the lateral distance d between the contour 40 and the circumcircle 10 has a local minimum, in particular the lateral distance d is zero.

FIG. 13 shows the tunable lens with both, the carrier 50 and the mount 6 with their corresponding connections to the shaping element 4 in schematic top view. The embodiment shown in FIG. 13 comprises the mount 6 and the carrier 50 shown in FIGS. 11 and 12. The carrier 50 and the mount 6 are congruent.

Figure 14:
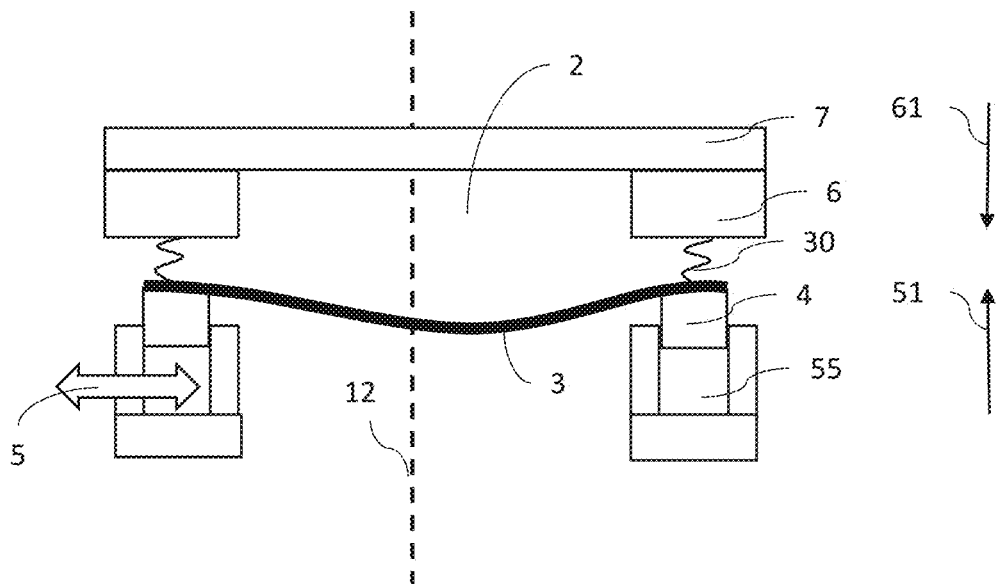
FIGS. 14 and 15 exemplary embodiments of tunable lenses, wherein the deflection force is applied uniformly on the shaping element FIGS. 16, 17, 18, 19 and 20 exemplary embodiments of shaping elements of tunable lenses.
Figure 15:
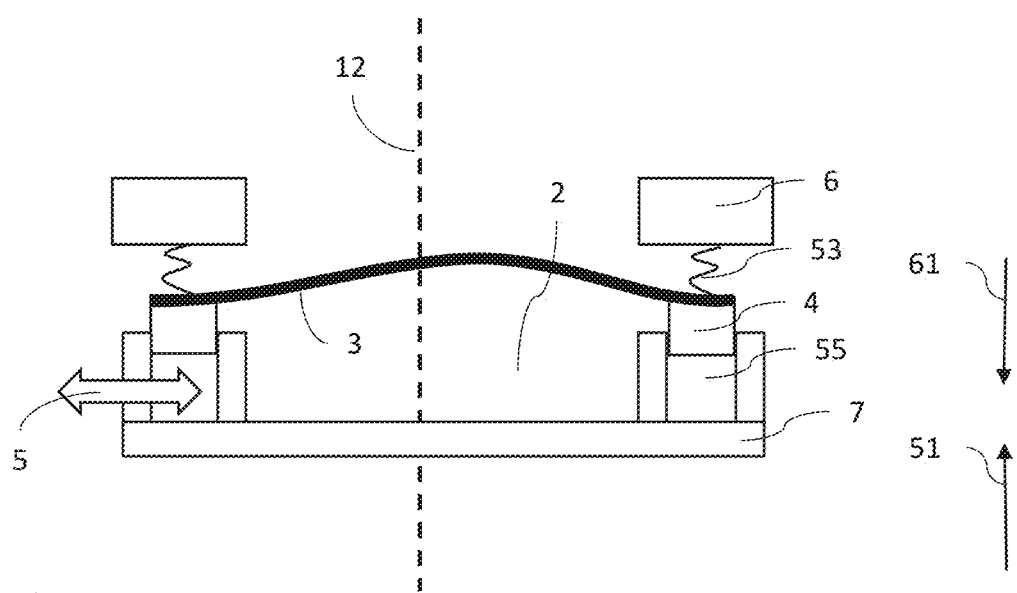

FIGS. 14 and 15 show exemplary embodiments of tunable lenses 1, wherein the deflection force 51 is applied uniformly on the shaping element 4. The tunable lens comprises a pressure chamber 55 which is arranged to transfer pressure to the shaping element 4.

In the exemplary embodiment shown in FIG. 14, the shaping element 4 is arranged on a side of the membrane 3 facing away from the fluidic volume 2. The actuator 5 is arranged to alter the pressure in the pressure chamber 55. The shaping element 4 is movably mounted and guided in the pressure chamber. The shaping element 4 delimits the pressure chamber 55 on one side. The pressure in the pressure chamber 55 is distributed uniformly on the shaping element 4. The shaping element 4 is displaced along the optical axis 12 by altering the pressure in the pressure chamber 55.

The fluidic volume 2 is delimited by the window element 7, the mount 6, the bellows 30 and the membrane 3. In particular the lens volume 2 is enclosed in a liquid-sealed manner. The bellows may act as elastic element 53, which transfers retention force 61 from the mount 6 to the shaping element 4. Increasing the pressure in the pressure chamber 55 results in an increased pressure in the liquid chamber 2, which causes a deflection of the shaping element 4, whereby the curvature of the membrane 3 is increased.

Compared to the embodiment shown in FIG. 14, the embodiment shown in FIG. 15 the liquid chamber 2 is arranged on the other side of the membrane 3. In FIG. 15 the liquid chamber 2 is enclosed by the window element 7 the shaping element 4, the pressure chamber 55 and the membrane 3. Increasing the pressure in the pressure chamber 55 results in a decreased pressure in the liquid chamber 2, which causes a deflection of the shaping element 4, whereby the curvature of the membrane 3 is reduced. The mount is coupled to the shaping element 4 by means of an elastic element 53, which transfers the retention force 61 from the mount 6 to the shaping element.

Figure 16:
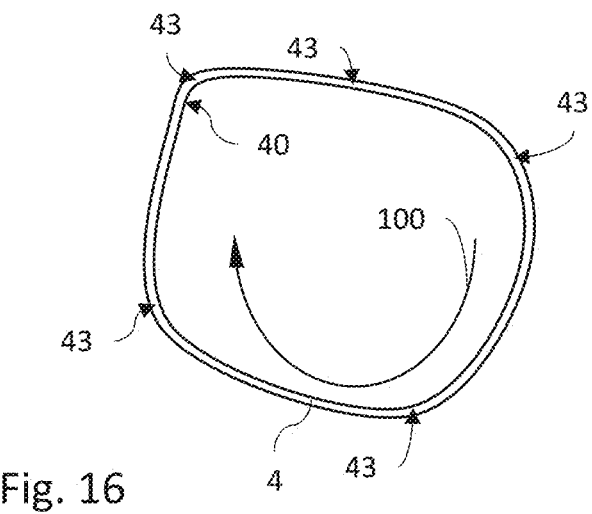

FIG. 16 shows an exemplary embodiment of the shaping element 4 of a tunable lens 1 in a schematic top view, wherein the tunable lens is arranged to alter are sphere, cylinder power and cylinder axis in a definable manner. In particular, the tunable lens 1 comprising the shaping element 4 is arranged to alter prism power, prism axis and add in a definable manner. The shaping element 4 comprises five actuation points 43, wherein at each actuation point 43 is a deflection point 41, a retention point 42 or both. The actuation points 43 are distributed along the perimeter 100 of the shaping element 4 and seen in a top view the actuation points 43 are located at positions where curvature of the contour 40 has a local extremum or is zero.

Figure 17:
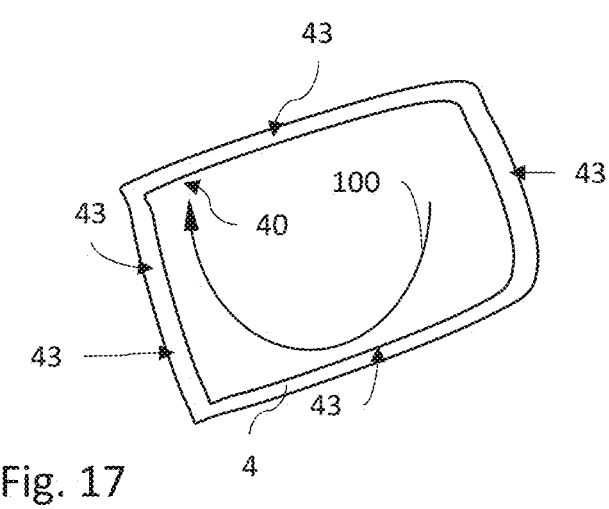

FIG. 17 shows an exemplary embodiment of the shaping element 4 of a tunable lens 1 in a schematic top view. The shaping element 4 comprises five actuation points 43, which are distributed along the perimeter 100 of the shaping element 4 and seen in a top view the curvature of the contour 40 at the actuation points 43 has a same value. In this particular case, the curvature of the contour 40 at the actuation points is zero.

Figure 18:
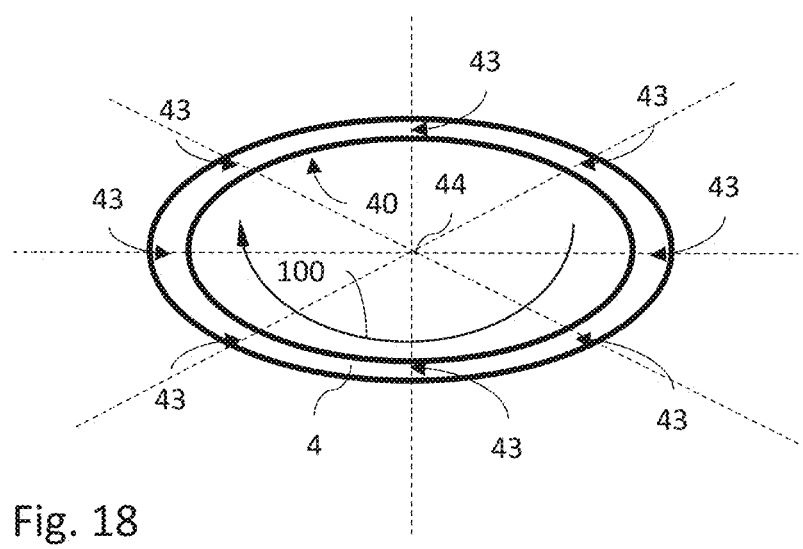

FIG. 18 shows an exemplary embodiment of the shaping element 4 of a tunable lens 1 in a schematic top view. The shaping element 4 comprises eight actuation points 43, which are distributed along the perimeter 100 of the shaping element 4. The contour 40 of the shaping element 4 is point-symmetric. At least two of the actuation points 43 are arranged on opposite sides of the shaping element 4 with respect to a point of symmetry 44 of the contour 40. The actuator 5 is arranged such, that the actuation points 43 which are arranged on opposite sides of the shaping element 4 have the same deflection along the optical axis in each tuning state of the tunable lens 1.

Figure 19:
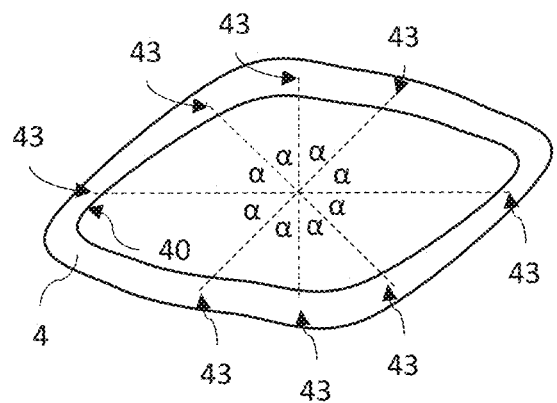

FIG. 19 shows an exemplary embodiment of the shaping element 4 of a tunable lens 1 in a schematic top view. The shaping element 4 comprises eight actuation points 43, which a distributed along the perimeter 100 of the shaping element 4. The actuation points 43 have an equal angel distance with respect to each other. The angel distance is measured with respect to the center of the circumcircle 10 of the shaping element 4. In the present case, the actuation points 43 are arranged at an angle distance alpha of 45° with respect to each other.

Figure 20:
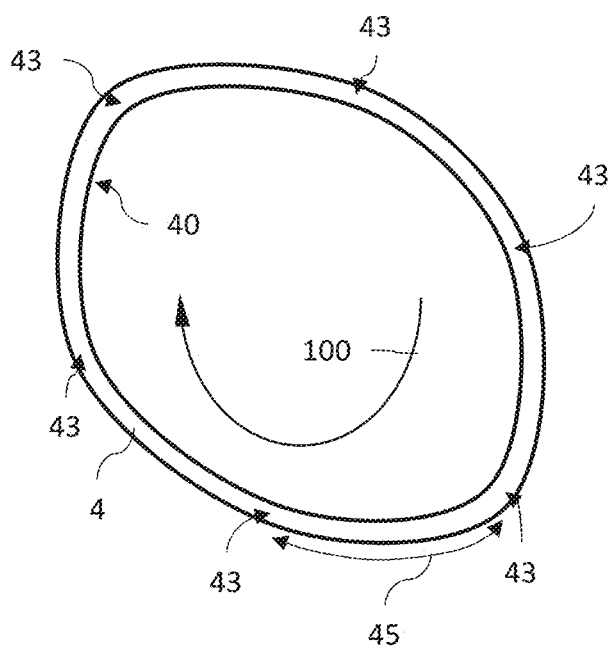

FIG. 20 shows an exemplary embodiment of the shaping element 4 of a tunable lens 1 in a schematic top view. The shaping element 4 comprises six actuation points 43, which a distributed along the perimeter 100 of the shaping element 4. The actuation points 43 are distributed at distances of equal arc lengths 45 along the perimeter 100 with respect to each other.

According to an embodiment of the method for controlling a tunable lens, wherein the tunable lens 1 comprises a flexible membrane 3 and a shaping element 4, the membrane 3 forms an optical surface of the tunable lens 1, the shaping element 4 is attached to the membrane 3, the shaping element 4 has a non-circular ring contour in top view, the shaping element 4 surrounds an optically active region of the membrane 3, wherein the deformation of the membrane 3 when tuning the lens 1 is controlled by the deflection of the shaping element 4 in a direction along the optical axis 12, wherein the contour of the shaping element 4 extends within an imaginary circumcircle 10, and the amount of deflection of the shaping element 4 is proportional to a lateral distance d of the contour 40 to the circumcircle 10.

According to a further embodiment of the method, the deflection of the shaping element 4 is controlled such that the contour 40 of the shaping element 4 lies on a surface of an imaginary spherical segment 11, wherein the radius of curvature of said spherical segment alters when the tunable lens is tuned.

According to yet another embodiment of the method, a deflection force is applied to the shaping element 4 and a retention force is applied to the shaping element 4, wherein the retention force and the deflection force act in opposite directions along the optical axis 12, and the deflection force is applied uniformly to the shaping element 4 and the absolute value of the retention force is proportional to a lateral distance d of the contour 40 to the circumcircle 10.

Furthermore, according to an embodiment of the method, a deflection force is applied to the shaping element 4 and a retention force is applied to the shaping element 4, wherein the retention force and the deflection force act in opposite directions along the optical axis 12, the deflection force is applied to discrete deflection points 41 on the shaping element 4 and the absolute value of the deflection force at each deflection point 41 is proportional to a lateral distance d of the deflection point 41 to the circumcircle 10, and/or the absolute value of the retention force is proportional to a lateral distance d of the retention point 42 to the circumcircle 10.

The invention is not limited to the embodiments by means of which the invention is described. Rather, the invention encompasses any new feature as well as any combination of features, which in particular includes any combination of features in the claims, even if that feature or combination itself is not explicitly stated in the claims or embodiments.

LIST OF REFERENCE SIGNS 1 tunable lens
2 fluidic volume
3 membrane
4 shaping element
5 actuator
6 mount
7 window element
30 bellows
10 circumcircle
11 surface of spherical section
12 optical axis
21 lens chamber
22 reservoir
40 contour
41 deflection point
42 retention point
43 actuation point
44 Point of symmetry
45 arc length
50 carrier
51 deflection force
52 lever
53 elastic element
54 link
55 pressure chamber
520 coupling position
521 coupling element
522 pivot point
100 perimeter of shaping element
d lateral distance
w width of shaping element

We claim:

1. Tunable lens comprising a fluidic volume, a flexible membrane, a shaping element, and an actuator, wherein
   the membrane delimits the fluidic volume on one side,
   the shaping element is attached to the membrane,
   the shaping element surrounds an optically active region of the membrane,
   the shaping element is arranged to alter optical properties of the tunable lens by deflection wherein the deflection describes a displacement of the shaping element in a direction along an optical axis of the tunable lens,
   in top view the shaping element has a non-circular contour, wherein the contour extends within an imaginary circumcircle, and
   wherein the actuator is a single actuator arranged to apply a deflection force to multiple deflection points of the shaping element wherein the deflection points are arranged at regions of the shaping element, where the contour has a local maximum lateral distance to the circumcircle, and/or the tunable lens comprises a mount, wherein the mount is arranged to apply a retention force to the shaping element, the retention force is applied to multiple retention points of the shaping element, wherein the retention points are arranged at regions of the shaping element, where the contour has a local minimum lateral distance to the circumcircle.

2. Tunable lens according to claim 1, wherein the shaping element is arranged such that the contour of the shaping element lies on the surface of an imaginary spherical surface, wherein a radius of curvature of the imaginary spherical surface changes when altering the optical properties of the tunable lens.

3. Tunable lens according to claim 1, wherein the absolute value of the deflection force applied at each deflection point is proportional to a lateral distance of the deflection point to the circumcircle.

4. Tunable lens according to claim 1, wherein
   the deflection force applied to one of the deflection points is larger for larger lateral distances of the respective deflection point to the circumcircle, and/or
   the retention force applied to one of the retention points is smaller for larger lateral distances of the retention point to the circumcircle.

5. Tunable lens according to claim 1, wherein the retention points and the deflection points are arranged alternatingly along the perimeter of the shaping element.

6. Tunable lens according to claim 1, wherein at least one of the deflection force or the retention force is applied non-uniformly to the shaping element.

7. The tunable lens according to claim 1, wherein the absolute value of the retention force applied at each retention point is proportional to a lateral distance of the retention point to the circumcircle.

8. Method for controlling a tunable lens, wherein the tunable lens comprises a flexible membrane and a shaping element, wherein the membrane forms an optical surface of the tunable lens,
the shaping element is attached to the membrane,
the shaping element has a non-circular ring contour in top view,
the shaping element surrounds an optically active region of the membrane,
and wherein the method comprises the step of tuning the lens by deforming the membrane, wherein deforming the membrane is controlled by deflecting the shaping element in a direction along the optical axis, wherein
the contour of the shaping element extends within an imaginary circumcircle, and
wherein for deflecting the shaping element, a deflection force is applied to multiple deflection points of the shaping element by a single actuator, wherein the deflection points are arranged at regions of the shaping element, where the contour has a local maximum lateral distance to the circumcircle, and/or a retention force is applied to the shaping element via a mount of the tunable lens, wherein the retention force is applied to multiple retention points of the shaping element, wherein the retention points are arranged at regions of the shaping element, where the contour has a local minimum lateral distance to the circumcircle.

9. Method according to claim 8, wherein
said deflecting of the shaping element is controlled such that the contour of the shaping element lies on a surface of an imaginary spherical segment,
wherein the radius of curvature of said spherical segment alters when the tunable lens is tuned.

\* \* \* \* \*